United States Patent [19]
Siverbrook et al.

[11] Patent Number: 5,454,071
[45] Date of Patent: Sep. 26, 1995

[54] METHOD AND APPARATUS FOR PERFORMING OBJECT SORTING AND EDGE CALCULATION IN A GRAPHIC SYSTEM

[75] Inventors: Kia Siverbrook, Woollahra; Simon R. Walmsley, Epping, both of Australia

[73] Assignees: Canon Kabushiki Kaisha, Tokyo, Japan; Canon Information Systems & Research Australia Pty Limited, NSW, Australia

[21] Appl. No.: 53,365

[22] Filed: Apr. 28, 1993

[30] Foreign Application Priority Data

Apr. 29, 1992 [AU] Australia ................................. PL2145
Apr. 29, 1992 [AU] Australia ................................. PL2156

[51] Int. Cl.$^6$ ................................................. G06F 15/00
[52] U.S. Cl. ................................................. 395/141
[58] Field of Search ........................... 395/133, 140, 395/141, 142, 143; 345/135, 136, 133

[56] References Cited

U.S. PATENT DOCUMENTS 5,191,645  3/1993  Carlucci et al. ................. 395/159
5,313,566  5/1994  Hedley et al. ................... 395/119
5,335,319  8/1994  Obata ............................... 395/141
5,371,840  12/1994  Fisher et al. .................... 395/133

*Primary Examiner*—Phu K. Nguyen
*Attorney, Agent, or Firm*—Fitzpatrick, Cella, Harper & Scinto

[57] ABSTRACT

In a real-time object (RTO) graphics system, an RTO processor is disclosed which incorporates an object sort unit and an edge calculation unit. Object fragment data for each graphic object is received by the RTO processor, and is temporarily stored in memory. The sort unit sorts the fragment data for each scan line by first decomposing the fragment data into ordered sets, and then, commencing with the first active pixel for each fragment that commences on a line, sorting the data within the set and linking the sorted set with the next ordered set. Once sorted, the edge calculation unit reads the fragment data in line and pixel order from memory and calculates object edge intersections for each fragment on the current line being rendered while updating the memory with data for the respective fragment for the next scan line. The edge intersections are output in real-time and displayed on a display device.

18 Claims, 12 Drawing Sheets

Before

After

METHOD AND APPARATUS FOR PERFORMING OBJECT SORTING AND EDGE CALCULATION IN A GRAPHIC SYSTEM

BACKGROUND

1. Field of the Invention

The present invention relates generally to graphics systems and in particular, discloses a method and apparatus for rendering object based graphics for real-time display of an image without the use of a frame store.

2. Description of the Related Art

The background art will now be described with reference to the following drawings in which:

FIG. 1 illustrates the outline of an object formed from a number of lines

FIG. 2 illustrates the associated y-bucket list of edge information of the prior art FIG. 3 illustrates the current line edge list of the prior art as it appears while processing the scan line Referring now to FIG. 1, FIG. 2 and FIG. 3, there is illustrated a traditional scan conversion method for an image made up of a list of objects, whereby each object's boundary edges are approximated by a polygon 101 and the polygon 101. Polygon 101 is made up of a number of edges 102, 103, 104, 105, 106 and 107. These edges are normally stored as a list of edges 108, where each edge is sorted by a maximum y co-ordinate value, and the list of edges 108 makes provision for at least one edge for each line.

Each edge list entry 109 includes information needed to generate scan line intersections, including x co-ordinate values, the location of the intersection on the topmost scan line; dx, the amount by which the x value changes from scan line to scan line; and dy, the number of intersections that the edge will generate.

The scan line conversion method generates the image from top to bottom, one scan line at a time. As it does so, it maintains an active edge list, sorted by x, listing all edges that cross the current scan line 110. Successive pairs of edges demarcate portions of the scan line in which the object is visible and are used to generate the display for the current scan line 110. After displaying a current scan line 110, each edge record is updated for the next scan line (x:=x+dx, dy:=dy−1). Occasionally these changes require edges in the active edge list to be interchanged so that the list remains sorted by x. Some edges also will terminate and be removed from the list, in addition to any new edge list entry 109 in the current scan line entry in list of edges 108 being incorporated into the current edge list 111.

As described in U.S. patent application No. Ser. No. 08/053,219 filed Apr. 28, 1993, claiming priority from Australian Provisional Patent Application No. PL 2150, of filed Apr. 29, 1992 entitled "Object Based Graphics Using Quadratic Polynomial Fragments", a method has been proposed for the representation of graphic objects by the use of quadratic polynomial fragments. Furthermore, prior to scanline conversion, it is preferably to arrange the objects in such a manner that facilitates rendering by scan-line conversion.

SUMMARY OF THE INVENTION

Accordingly, it is an object of the present invention to provide arrangements by which the processing of object based images can be improved.

In accordance with one aspect of the present invention there is disclosed a method of sorting data, said method comprising the steps of:

(i) selecting an initial sort resolution;

(ii) decomposing said data into a plurality of ordered sets based on said resolution;

(iii) commencing with a first one of said sets, sorting said data within said set;

(iv) linking the sorted set with the next ordered set; and (v) sequentially repeating the steps (iii) and (iv) until a last of said sets has been sorted resulting in a recomposed sorted list of said data.

In accordance with another aspect of the present invention there is disclosed a method of sorting object data defining individual outline curve segments of an image in an object based graphics system, said method comprising the steps of:

(i) inputting said object data for each said curve segment and sequentially storing same as a plurality of linked lists each based on a start line of each said curve segment;

(ii) sorting each said linked list by
 (a) decomposing said object data within said list into a plurality of ordered sets each having a predetermined range resolution of pixel location values,
 (b) commencing with a first one of said ordered sets;
 (c) checking if said set has any entries and if so, sorting into a linked list said object data for said set by pixel location, and
 (d) if not, proceeding to the next said set and repeating step (ii)(c); wherein each said linked list once created is linked with the list from the preceding set to form a single linked list of object data sorted by pixel value within a line.

In accordance with another aspect of the present invention there is disclosed a method of rendering object data defining individual ouline curve segments of an image in an object based graphics system, said method comprising the steps of:

(a) traversing lists of said object data arranged in ascending pixel order, each said list pertaining to a single line of said image being rendered; and (b) for each unit of said object data unit, the steps of:
 (i) determining a pixel value for display;
 (ii) calculating a new pixel value of said unit for a subsequent line; and
 (iii) merging the new pixel value into the list for the subsequent line in order with other said units in said subsequent line.

In accordance with another aspect of the present invention them is disclosed a method of processing object data defining individual outline curve segments of an image in an object based graphics system, said image being intended for rasterised display, said method comprising the sequential steps of:

(i) inputting said object data and sequentially storing same as a plurality of linked lists based on a start line in said image of each said curve segment;

(ii) sorting each said linked list by:
 (a) decomposing said object data within said list into a plurality of ordered sets each having a predetermined range resolution of pixel location values,
 (b) commencing with a first one of said ordered sets;
 (c) checking if said set has any entries and if so, sorting into a linked list said object data of said set by pixel location, and
 (d) if not, proceeding to the next said set and repeating step (ii)(c); wherein each said linked list once created is linked with the list from the preceding set to form a single linked list of object data sorted by pixel value within a line;

(iii) real-time rendering said object data by the steps of:
(a) traversing said linked lists in ascending pixel order, each said list pertaining to a single line of said image being rendered; and
(b) for each curve segment data unit of each said list traversed, the steps of:
(i) determining a pixel value for display;
(ii) calculating a new pixel value of said unit for a subsequent line; and
(iii) merging the new pixel value into the list for the subsequent line in order with other said units in said subsequent line.

Preferably, the curve segments represent object fragments of graphic objects and preferably comprise quadratic polynomial fragments which include object data comprising a start line value corresponding to a displayable line which the quadratic polynomial fragment commences, an end line value corresponding to a displayable line on which the quadratic polynomial fragment ends, a pixel value corresponding to a pixel position in said start line at which the quadratic polynomial fragment commences, a gradient value corresponding to the gradient of the quadratic polynomial fragment on the line upon which the quadratic polynomial fragment commences, and a gradient derivative value corresponding to the derivative of the gradient of the quadratic polynomial fragment.

BRIEF DESCRIPTION OF THE DRAWINGS

A preferred embodiment of the present invention will now be described with reference to the drawings in which.

DETAILED DESCRIPTION OF THE PREFERRED EMBODIMENT

Figure 1:
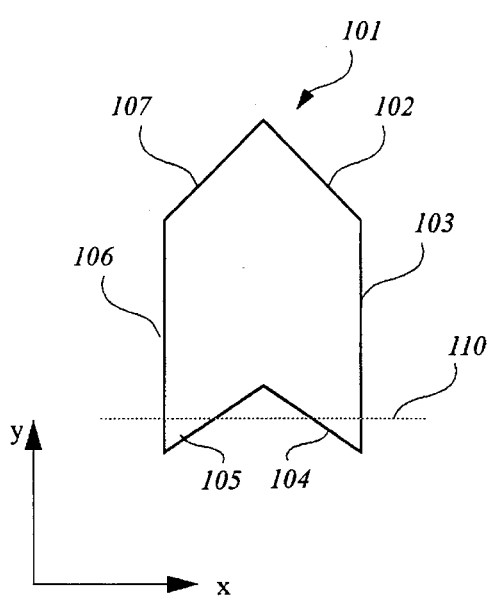
FIGS. 1–3 shows the techniques used in prior arts.
Figure 2:
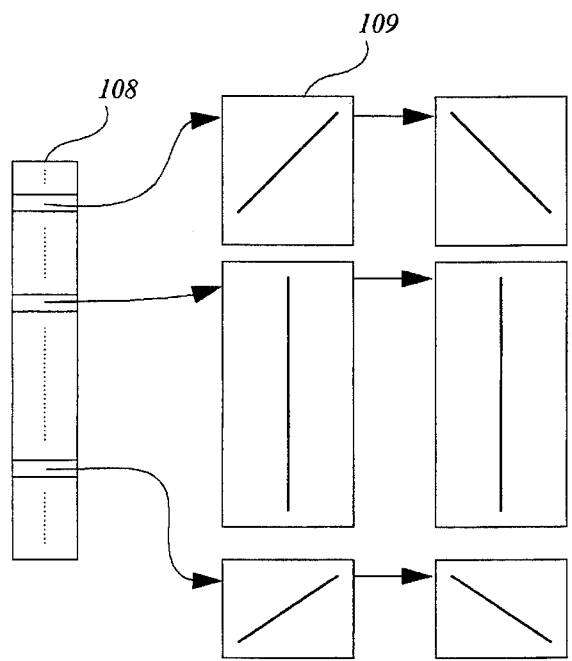
Figure 3:
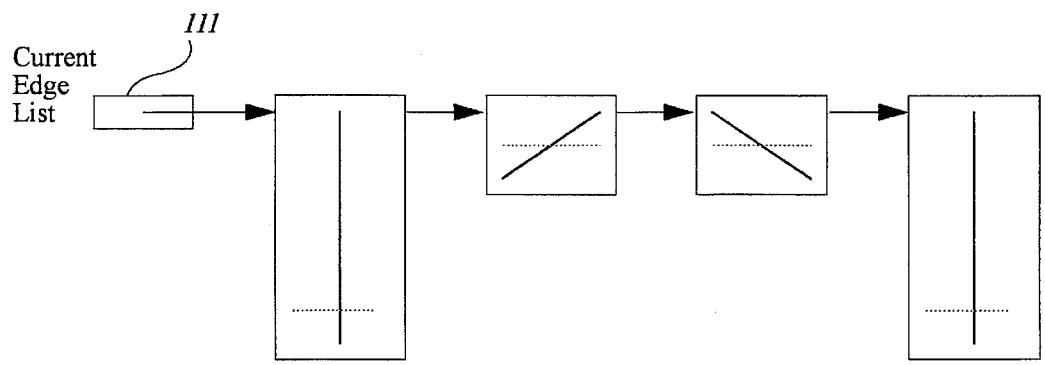
Figure 4:
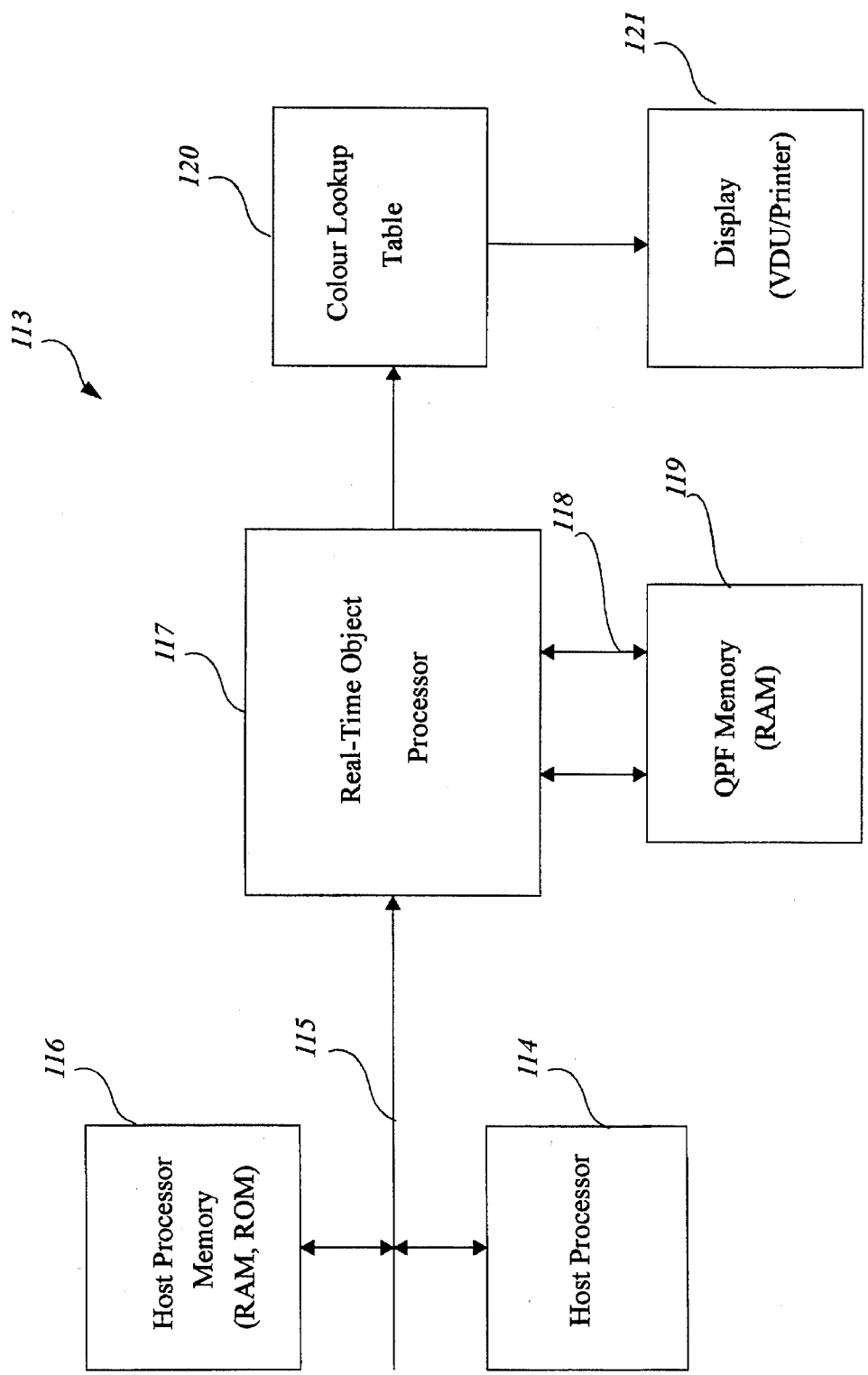
FIG. 4 shows a schematic block diagram of an RTO graphics system.

U.S. Patent Application Ser. No. 08/053,373, filed Apr. 28, 1993, entitled "A Real-Time Object Based Graphics System" lodged concurrently herewith and the disclosure of which is hereby incorporated by reference, discloses a real-time object (RTO) graphics system 113 shown in FIG. 4 of the present specification which includes a controlling host processor 114 connected via a processor bus 115 to a processor memory 116 which includes ROM and RAM. The host processor 114 operates to form a object list of objects which are used to form an image. The object list is stored in the RAM portion of the processor memory 116 in which the objects can be derived from the ROM portion of the processor memory 116 or alternatively input to the RTO graphics system 113 via any known external means such as a disc drive, a digitising tablet of a graphics workstation or the like.

The object list includes various individual objects in which the outline of each object is described by a plurality of object fragments which, in the preferred embodiment are quadratic polynomial fragments (QPF's).

As specifically described in U.S. patent application No. Ser. No. 08/053,219, filed Apr. 28, 1993, entitled "Object Based Graphics Using Quadratic Polynomial Fragments", lodged concurrently herewith and the disclosure of which is hereby incorporated by cross-reference, a QPF can be described by the following QPF data components: START_PIXEL, $\Delta$PIXEL, $\Delta$ $\Delta$PIXEL, START_LINE, and END_LINE.

The curve fixed locations for the QPF for various lines of the display can be determined as follows:

PIXEL(line$_{n+1}$)=PIXEL(line$_n$)+$\Delta$PIXEL(line$_n$)

$\Delta$PIXEL(line$_{n+}$)=$\Delta$PIXEL(line$_n$)+$\Delta\Delta$PIXEL where

PIXEL(line$_{n=START\_LINE}$)=START—PIXEL; and $\Delta$PIXEL(line$_{n=START\_LINE}$)=$\Delta$PIXEL. Connected to the processor bus 115 is a RTO processor 117 which manipulates objects and their QPFs from the object list so as to output rasterised image data to a colour look-up table 120 for reproduction of the image described by the object list on a display such as a video display unit or printer. The RTO processor 117 also connects via a QPF bus 118 to a QPF memory 119 formed of static RAM which is used for the storage of QPFs whilst the RTO processor 117 is calculating the image data.

Where the host processor 114 generates objects, and/or preformatted objects are available and these objects are configured using cubic polynomials such as Bezier splines, these polynomials can be converted to QPFs in the manner described in U.S. patent application Ser. No. 08/053,213, filed Apr. 28, 1993, Provisional Patent Application No. PL2149 (Attorney Ref: (RTO9)(203174)) entitled "Bezier Spline to Quadratic Polynomial Fragment Conversion", lodged concurrently herewith and the disclosure of which is hereby incorporated by reference Referring now to FIG. 5, there is shown, a data flow diagram of the RTO processor 117 including an image fetch unit 122 connected to the processor memory 116 via the processor bus 115. Objects and their QPFs are fetched from the processor memory 116 by the image fetch unit 122 and are output to a QPF first-in-first-out (QPF FIFO) register 123 which is four words deep. Data in the QPF FIFO 123 is tagged as object data or QPF data. The QPF FIFO 123 is used to decouple fetching from data processing, so as to increase the access efficiency to the processor bus 115.

Data is output from the QPF FIFO 123 into a preprocessing pipeline (PPP) 125 which performs a series of calculations on the data before it is stored in the QPF memory 119. These operations are:

(126) applying scaling and translation factors for the current object to each QPF;

(127) filtering out QPF's which will not effect the display;

(128) iteratively recalculating the values in a QPF which start before the first line of the display, to yield a QPF starting on the first line of the display; and (129) applying a correction to the QPF's rendering if the image is to be interlaced (as, for example, on a television display).

From the PPP 125, the QPFs are stored in the QPF memory 119. The QPF data is stored as a series of linked lists, one for each line in the image to be formed. After all of the QPFs in the image have been fetched and stored in the QPF memory 119, the linked list for each line is sorted by a pixel sorter 130 in order of pixel value (i.e. position) for each line, in preparation for rendering of the image to the display 121.

In video applications, image preparation of the new image occurs in one half of a double buffered QPF memory, whilst the other half is used for rendering. However, the QPF memory 119 is single ported, so the image preparation and image rendering sections of the RTO processor 117 must compete for access to the QPF bus 118.

Image rendering is commenced in synchronization with the display 121. Rendering consists of calculating the intersection of QPFs with each line on display 121 in turn, where these intersections define the edges of objects. Each edge (or intersection) is used in the calculation of the level which is to be displayed at a particular pixel position on the scan line.

For each line in the image, the render process steps through the list of QPFs for that line, executing the following steps:

copy the pixel value (location), pixel level (colour) and effects information into a pixel FIFO 132 to be picked up for fill generation and calculation;

calculate the values of the QPFs intersection for the next line, or discard QPFs which terminate on the next line; and merge the recalculated QPF into the list of QPF's starting on the next line.

Rendering and recalculation has the highest priority on the QPF bus 118, however the QPF bus 118 is freed for storage or sorting access whenever the pixel FIFO 132 is filled, or all the QPFs for the current line have been processed.

Data is sequenced out of the pixel FIFO 132, which is sixteen words deep, under the control of a pixel counter which is incremented by each pixel clock cycle derived from the display 121. The fill generator 133 resolves the priority levels of the objects in the display, and outputs the highest visible level at each pixel position to the colour look-up table 120 prior to display. The fill generation can be modified by an effects block 134, so as to implement visual effects such as transparency.

Figure 5:
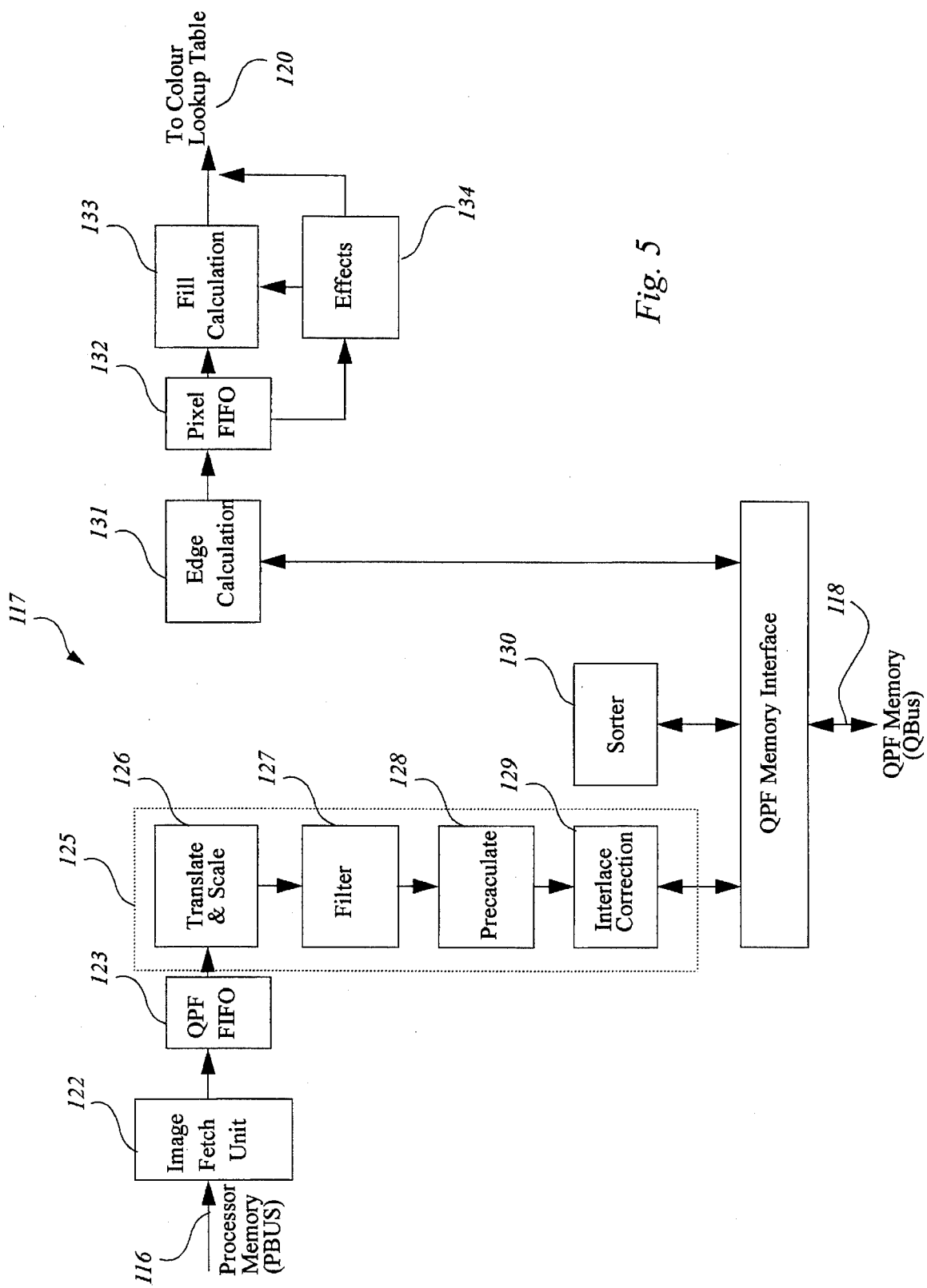
FIG. 5 is a data flow diagram of the RTO processor seen in FIG. 4.
Figure 6:
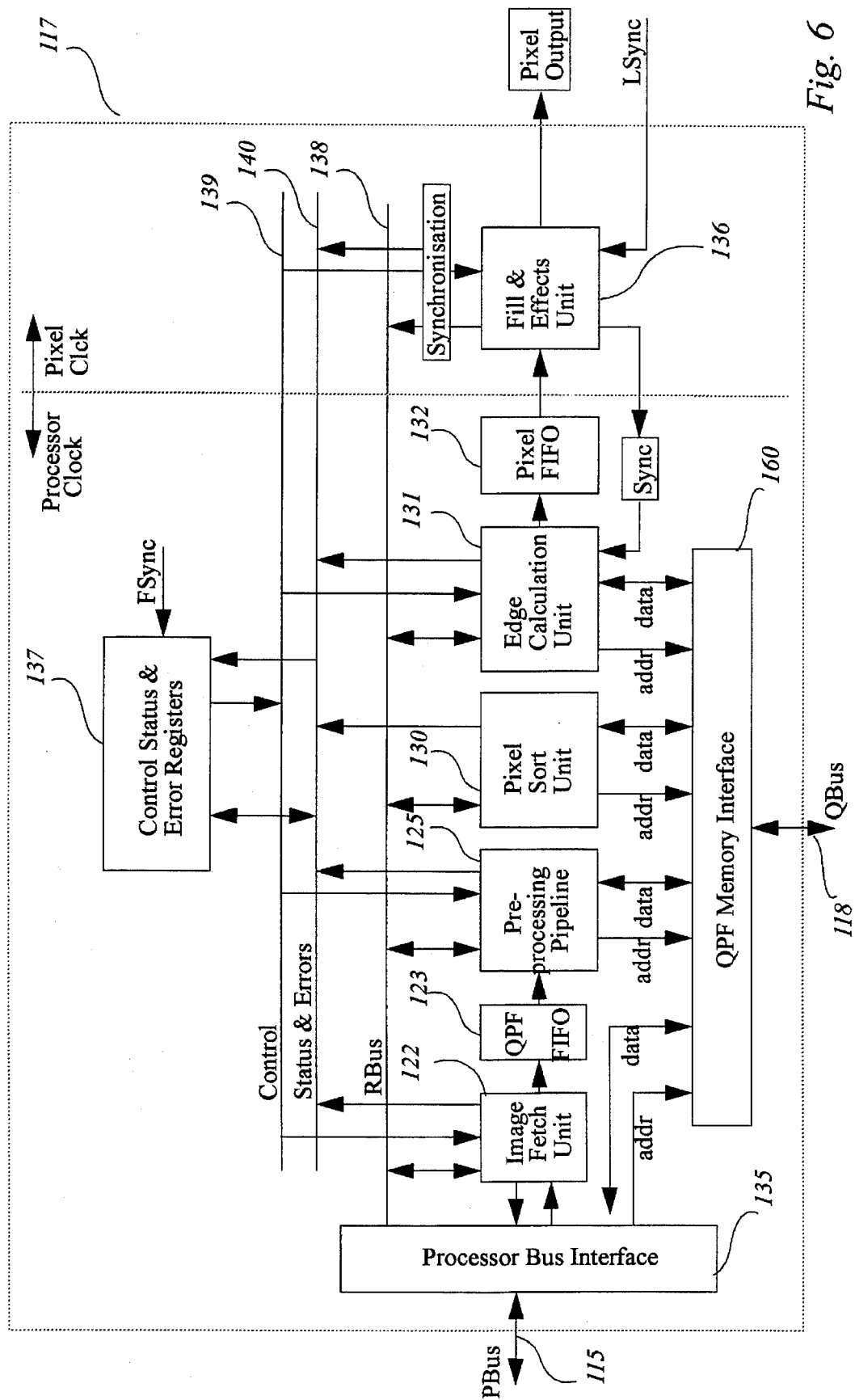
FIG. 6 is a schematic block diagram representation of the RTO processor.

Referring now to FIG. 6, there is shown, the internal structure of the RTO processor 117 in which a processor bus interface 135 interconnects between the processor bus 115 and the image fetch unit 122. The various stages of the data flow diagram of FIG. 5 appear repeated as individual hardware units in FIG. 6 save for the combination of the fill generator 133 and the effects block 134 as a single fill and effects unit 136. A series of control, status and error (CSE) registers 137 is also provided which allows for monitoring of the RTO processor 117 by the host processor 114. This occurs via a register bus (RBUS) 138 which connects to each of the individual blocks of the RTO processor 117 save for the QPF FIFO 123 and pixel FIFO 132. A control bus 139 and a status and error bus 140 are also used to transport data about the RTO processor 117.

As described in U.S. patent application Ser. No. 08/053,378, filed Apr. 28, 1993, entitled "A Pre-processing Pipeline for RTO Graphics Systems", lodged concurrently herewith and the disclosure of which is hereby incorporated by reference, the PPP 125 stores QPF data in the QPF memory 119 as a series of linked lists in which each linked list corresponds to a particular scan line of the display 121. The QPF's come to be stored in this manner by the host processor 114 specifying START LINE value for each QPF description indicating the scan line for which the QPF commences. This represents the first step of the sorting of the QPF's.

Figure 7:
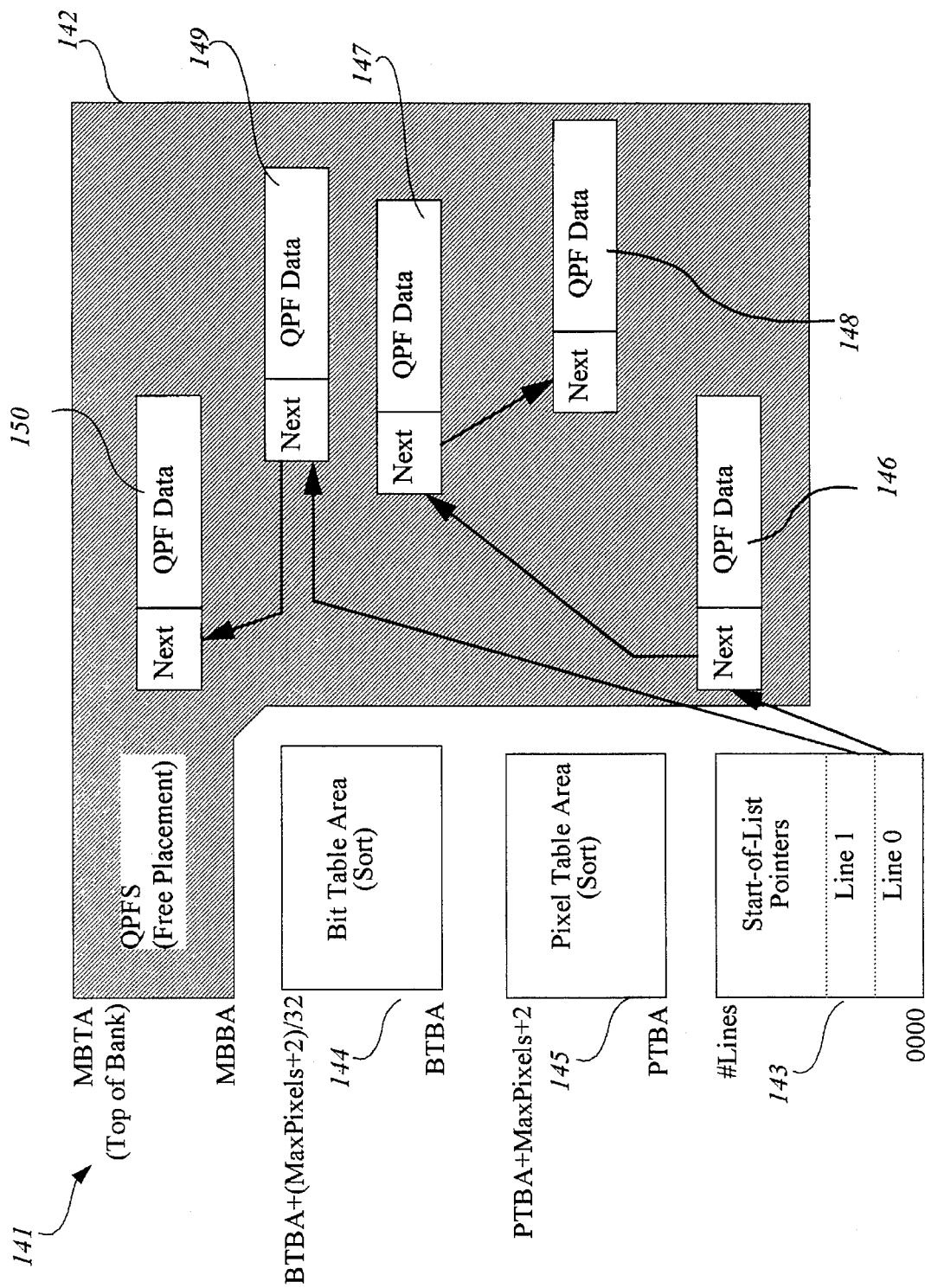
FIG. 7 shows the configuration of QPF data in the QPF memory.

The QPF memory 119 is structured in the manner shown in FIG. 7 where one memory bank 141 of the QPF memory 119 is shown. If two banks are used, each bank is organised in an identical fashion. The bank 141 is divided into four areas. Firstly, a line pointer table 143 is provided which contains one word for each scan line in the display 121, and is used for storing pointers which point to the start of each linked list for that particular scan line. The line pointer table 143 is configured to occupy the bottom of the QPF memory 119.

A pixel table area 145 is also provided which acts as a temporary storage area for the pixel sorting process. The base location of the pixel table area 145 is set by a pixel table base address (PTBA) register, and the size is one word for each pixel displayed in a line (MAXPIXELS) plus two additional words.

A bit table area 144 is also provided which is a further temporary storage area used during the pixel sort process. The base location is set by a bit table base address (BTBA) register, and the size of the bit table area 144 is that of the pixel table area 145, divided by 32, and rounded up to the nearest whole word.

The most significant portion of the memory bank 141 is the QPF free storage space 142 which contains all the QPF data. The QPF free storage space 142 occupies the top of the QPF memory 119, and the bottom address is set to a memory bank base address (MBBA), while the top address which is also the top address of the bank, is set to a register MBTA (memory bank top address).

Figure 8:
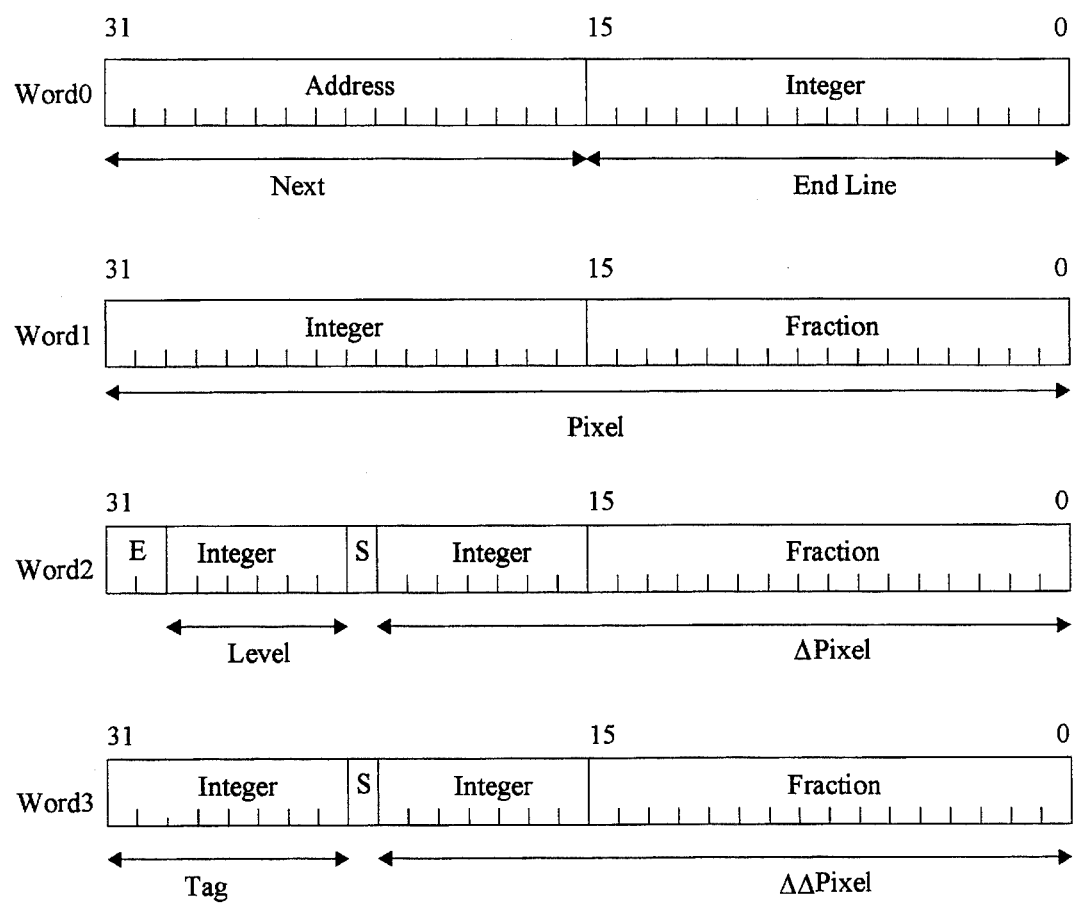
FIG. 8 shows the data format of single QPF in the QPF memory.

As seen in FIG. 7 the linked list for line zero, derived from the line pointer table 143 commences with a QPF 146 which points to a QPF 147 of higher PIXEL value which in turn points to a terminal QPF 148 of still higher PIXEL value. For line 1 of the display, the line table points to a QPF 149 which points to a terminal QPF 150 of higher PIXEL value. Referring now to FIG. 8, shows the configuration of each QPF in the QPF memory 119 and is seen to comprise a NEXT value which acts as a pointer to the next QPF in the linked list. The QPF further comprises and END LINE portion which indicates the scan line of the display at which the QPF ends. The QPF also comprises the remaining standard data blocks comprising PIXEL, ΔPIXEL, and ΔΔPIXEL as well as the LEVEL and TAG bits of the QPF.

PIXEL SORTING

Figure 9:
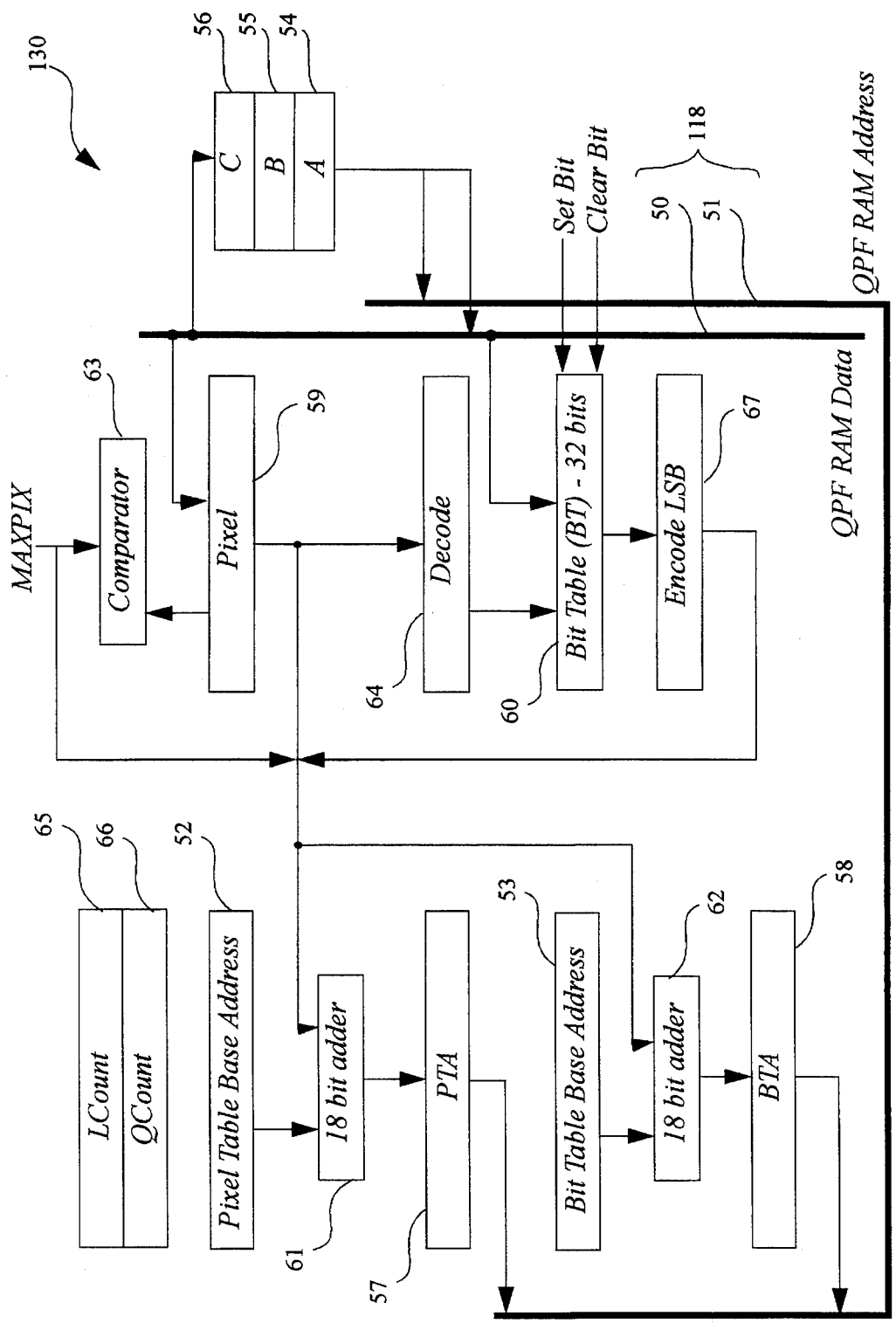
FIG. 9 is a schematic block diagram representation of the pixel sort unit.

Turning now to FIG. 9, the preferred structure of the pixel sorter 130 is shown which includes a 16-bit pixel table base address register 52 and a 16-bit table base address register 53 which identify those areas in the QPF memory 119 available as temporary storage for the pixel sorter 130. The registers 52 and 53 are loaded via the RBus 138, and are used by the pixel sorter 130 in address calculations.

Seven working registers are also provided. These comprise three 18-bit QPF registers A, B and C, two 18-bit working address registers PTA and BTA, a 16-bit pixel register 59, and a 32-bit bit table (BT) register 60.

Two 18-bit adders 61 and 62 are also provided and are used to calculate addresses offset from the base addresses residing in registers 52 and 53 respectively, and to increment and decrement other registers used for counting.

A 16-bit comparator 63 is also provided and is used to identify pixels which are out of the normal pixel range (0 to MAXPIXELS). Logic blocks 64 and 67 and also provided for decoding and encoding (respectively) entries in the bit table register 60. The pixel sorter 130 also interfaces to the QPF bus 118 which comprises a QPF data bus 50 and QPF address bus 51.

The sort process for each scan line is broken into two stages. First, the QPF list for a line is decomposed into the pixel table 145 in the QPF memory 119. The line is then recomposed from the pixel table 42 in order from the lowest PIXEL value to the highest. The sequencing of the sort is organised to minimise the number of QPF memory cycles required for each QPF.

Prior to commencing sorting of the first line in the QPF memory 119, each of the locations in the bit table area 144 are cleared. This ensures that the sort is not affected by corrupted or spurious start. The start-up sequence is initiated by setting the bit table address (BTA) 58 to BTBA. In each cycle, a QPF memory write of 0 is done at the address pointed to by the BTA 58, which is incremented each cycle, and compared against BTBA+MAXPIXELS/32. When the BTA 58 becomes greater than BTBA+MAXPIXEL/32, the start-up sequence is completed, and the pixel sorter 130 commences sorting of the PIXEL values within the first line. The start-up sequence is summarized in Table 1.

TABLE 1

START-UP SEQUENCE

| Bus Cycle | Address | Data Source | Other Operations During Cycle |
|---|---|---|---|
| 1. Write | BTA | 0 | BTA = BTA + 1<br>if BTA > BTBA + MAXPIX/32<br>  repeat 1<br>else<br>  Finish |

DECOMPOSITON

The sorting procedure then commences the decomposition stage which takes five cycles for each QPF, apart from duplicates, where two QPFs commence at the same location, which take six cycles. Table 2 summarized the operation of the decomposition process.

TABLE 2

DECOMPOSITION SEQUENCE

| Bus Cycle | Address | Data Source or Destination | Other Operations During Cycle |
|---|---|---|---|
| 1. Read | A.pixel | Pixel | |
| 2. Read | A.next | B | if Pixel <0,<br>  BTA = BTBA<br>else if PIXEL > = MAXPIX<br>  BTA = BTBA + (MAXPIX+1)/32 |

TABLE 2-continued

DECOMPOSITION SEQUENCE

| Bus Cycle | Address | Data Source or Destination | Other Operations During Cycle |
|---|---|---|---|
| 3. Read | BTA | BT | else BTA = BTBA + (PIXEL+1)/32<br>if PIXEL <0,<br>  PTA = PTBA<br>else if PIXEL = MAXPIX,<br>  PTA = PTA + MAXPIX + 1<br>else PTA = PTBA + PIXEL + 1<br>if [Decode {PIXELmod32} & QDATA] == 0<br>  goto 4a<br>else goto 4b |
| 4a. Write | PTA | A | BT = BT\|Decode [PIXELmod32]<br>QCount = QCount + 1 |
| 5a. Write | BTA | BT | A = B<br>if A! = 0 goto 1 |
| 4b. Read | PTA | C | |
| 5b. Write | A | C | |
| 6b. Write | PTA | A | A = B<br>if A! = 0 goto 1 |

The actions in each memory cycle are summarized as follows.

At the start of the decomposition stage, a line count register (LCount) 65 is incremented. A read cycle is performed from the resultant address, with the data then being loaded into the register A 54, which then points to the first QPF of the unordered list for that line. A register QCount 66 is set to zero.

The decomposition sequence comprises a main loop in which the PIXEL (the 16 most significant bits of the 32-bit Word 1 of FIG. 8) and NEXT values of each QPF are pointed to by the register A 54 and read into the pixel register 59 and the register B 55, respectively. From the PIXEL value, the bit table address and the pixel table address are calculated and loaded into the registers BTA 58 and PTA 57, respectively. Both the PTBA and the BTBA comprise 16 bits and these are input into the top 16 bits of the 18-bit adders 61 and 62 respectively. For the adder 61, the 16 bits of the pixel register 59 are input to the bottom 16 of the 18 bits. For the adder 62, only the top 11 bits of the pixel register are used in the bottom 11 of the 18-bit locations. The bit table 144 is then read and the next step of the decomposition process depends on whether the bit for the current PIXEL value has already been set.

Figure 10:
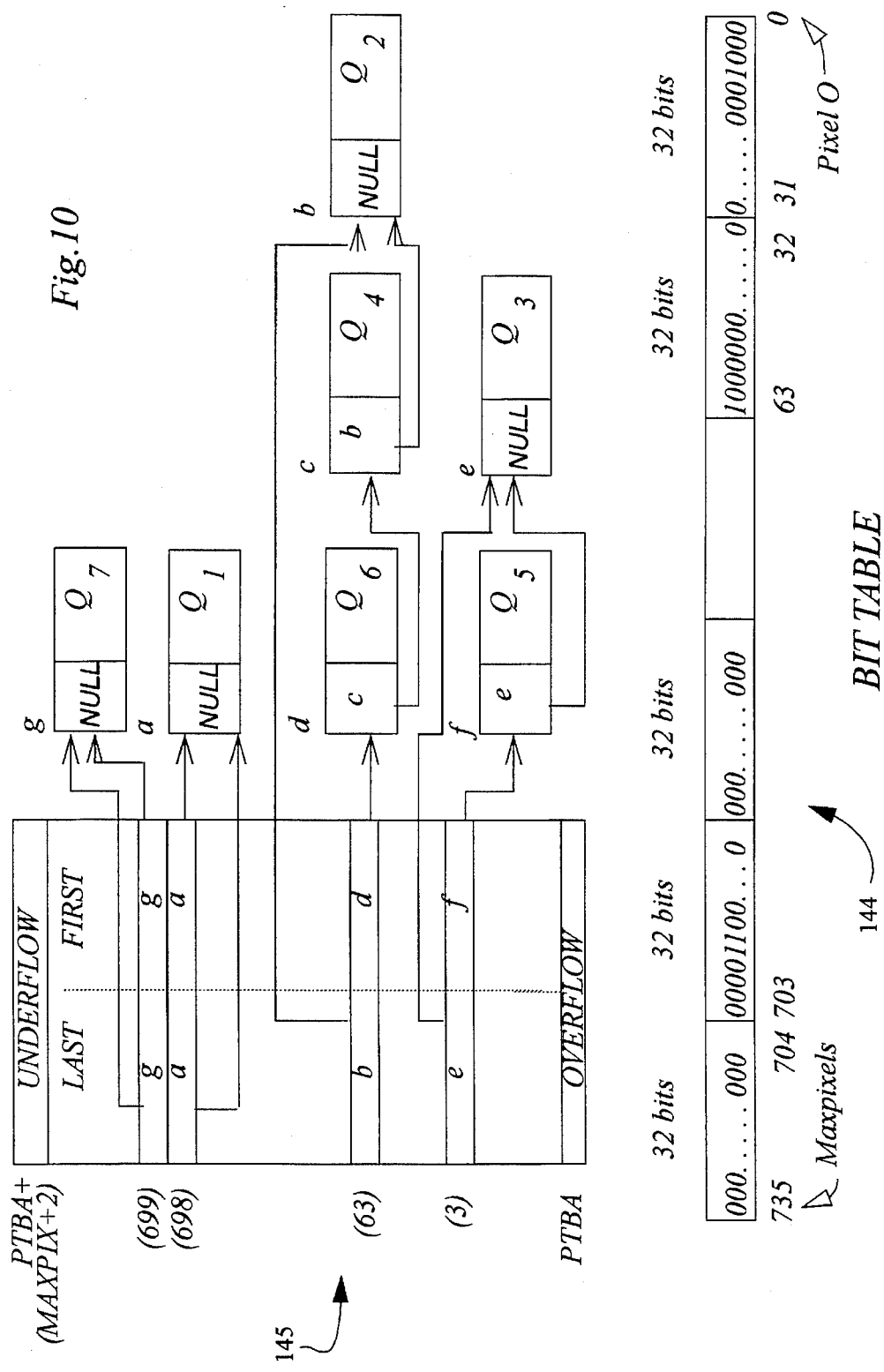
FIG. 10 shows the arrangement of QPFs after decomposition of a line.

The pixel table 145, as seen in FIG. 10, is 32 bits wide with each entry having a FIRST and LAST pointer relating a linked list for that PIXEL value (location).

If the appropriate bit has not been set, the pointer to the QPF, in register A 54, is written into both the FIRST and LAST locations in the appropriate location in the pixel table 145 for the PIXEL. In the next cycle, the appropriate bit in the BT register 60 is then set by using the decoder 64 to decode the lowest 5 bits in the pixel register 59 resulting in a 32-bit string that is loaded into the BT register 60, which then has the appropriate bit set. If the appropriate bit is set, this indicates that one or more previous QPFs have been found with the same PIXEL value. The current QPF is therefore then linked to these previous QPFs. This is done by reading the FIRST location of the linked list from the pixel table 145 into the register C 56, and then writing that location to the current QPF. The FIRST location is then updated with the pointer to the current QPF, so that this QPF has been linked in at the start of the QPF list for its PIXEL value. The QCount register 66 is not incremented in such a case.

The QPF list is followed by loading the value in register B 55 into register A 54, and repeating the main loop. This process proceeds until the value in register B 55 is found to be null, indicating the end of the line. At this stage, the QCount register 66 is equal to the number of unique PIXEL values having entries in the pixel table 145.

The decomposition process results in the pixel table 145 pointing to a series of linked lists, most of which are either empty, indicating that no QPFs commence at the particular pixel location on that line, or, have a single QPF entry indicating that one QPF commences at that pixel value. Where a linked list has a number of entries this means that a number of QPFs commence at that pixel location. The bit table 144 represents 32-bit wide sections of the scan line, in which set bits indicate the location of one or more QPF's. An example of the configuration of the tables 145 and 144 at the completion of decomposition is shown in FIG. 10.

In FIG. 10, seven QPFs, Q1 to Q7, are shown commencing on an arbitrary scan line. Pixel locations (699) and (698) each have QPF's Q7 and Q1 respectively whilst at pixel location (63), QPF's Q2, Q4 and Q6 reside. Pixel location (3) has QPF's Q3 and Q5 and each of the QPFs are scattered about the QPF memory space 142 at pointer locations (a) to (g). Note that where one or more QPF's reside at a pixel location, the pixel table 145 points to both ends of the linked list using the pointers FIRST and LAST.

Because the number of graphics objects that can be displayed in any one image is generally limited, so too is the number of QPFs, and accordingly the number of QPF starting locations. With this in mind, it will be apparent that the bit table 144 provides a relatively small number, in this case 23 (MAXPIX/32), of "buckets" of data each having a single 32-bit word. This configuration permits rapid sorting merely by testing if the value of each 32-bit word is greater than zero. If zero, there are no QPFs in those pixel locations. Accordingly, the QPFs in the line can then be readily sorted into ascending pixel order. This is called recomposition.

RECOMPOSITION

The recomposition sequence is summarised in table 3.

TABLE 3

RECOMPOSITION SEQUENCE

| Bus Cycle | Address | Data Source or Destination | Other Operations During Cycle |
|---|---|---|---|
| 1. Read | BTA | BT | PIXEL = PIXEL + 32 |
| 2a. None | — | — | if BT = 0 |
| | | | do 2a and goto 1 |
| | | | else do 2b and goto 3 |
| | | | BTA = BTA + 1 |
| | | | PTA = PIXEL + [encode lowest BT] |
| 3. Read | PTA | B, C | BT = BT & ~[select lowest BT] |
| | | | QCount = QCount − 1 |
| 4. Write | A | B | PTA = PIXEL + [encode lowest BT] |

TABLE 3-continued

RECOMPOSITION SEQUENCE

| Bus Cycle | Address | Data Source or Destination | Other Operations During Cycle |
|---|---|---|---|
| | | | A = C |
| | | | if BT = 0 |
| | | | goto 1 |
| | | | else |
| | | | goto 3 |

To commence recomposition, the BTA register 58 is set to BTBA, and the pixel register 59, which is used as a pointer to the pixel table, is set to PTBA. Register A 54 is set to the start-of-list location for the particular line. The first 32-bit word of the bit table 144 is then read and tested to determine if any of the bits are set. If not, the bit table address in the BTA register 58 is incremented, and the next word of the bit table 144 is read in the following cycle. If some of the bits are set, the word is stored in the BT register 60, and a zero is written into its memory location to clear that word of the bit table 144 for the next line. As each bit table word is read in, the pixel register 59 is incremented by 32, so that it always points to the entry in the pixel table 145 corresponding to the lowest set bit (LSB) of the current word of the bit table 144.

Once a word of the bit table 144 with at least one bit set has been loaded into the BT register 60, the lowest set bit is encoded by the encoder 67 and added to the value in the pixel register 59 using the adder 61. The result in the PTA register 57 is used to address the pixel table 145, reading the FIRST and LAST fields into register B 55 and register C 56 respectively. Register B 55 is then written to the address pointed to by register A 54, linking the QPF or QPFs at the current pixel into the ordered line list. The LAST pointer is transferred from register C 56 to register A 54, pointing to the place where the next QPF is to be linked in.

As the QPF or QPF's for each pixel locations are linked into the list, the QCount register 66 is decremented, and the appropriate bit in the BT register 60 is cleared. While any bits remain set in the BT register 60, the corresponding entries in the pixel table 145 are accessed into the list in order. When the BT register 60 is clear, entries from the bit table 144 are again read until one is found with at least one bit set. This continues until the QCount register 66 becomes zero, indicating that all of the QPF's have been linked into the list.

Figure 11:
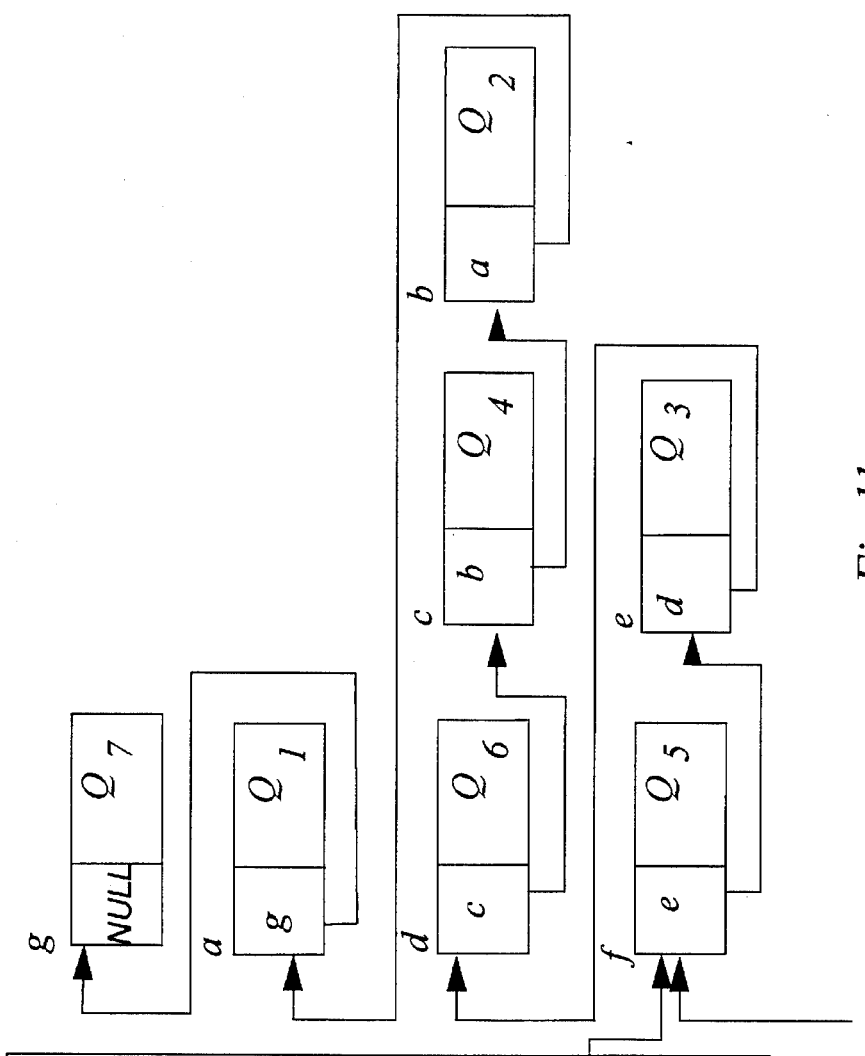
FIG. 11 shows the sorted link list.

Recomposition is then complete resulting in a single linked list of QPF's for a line arranged in ascending pixel order. FIG. 11 shows the corresponding arrangement for the QPF's of FIG. 10 and the pixel table 145.

Those skilled in the art will appreciate that the general sorting method described herein is not only applicable to sorting graphic object data but can be used in relation to any data, and advantageously where it is expected that many sub-sets of the sort will be empty, which can therefore be used to increase the efficiency of the sort. A particular application of this is in the sorting of large numbers of large numbers, for example, 1000×10 digit numbers. In such a case, it would be prudent to initially sort the digits upon input into 10 linked lists based on the first digit (thus corresponding to the line sort performed at the end of the PPP 125) and then sorting each list by buckets based on, say, the next two digits, thereby creating up to 100 new lists (thus corresponding to the pixel sort on a line). The actual selection and dividing of the sort requires a good understanding of the expected spread of data so that the speed of the sort can be optimised.

EDGE CALCULATION

The edge calculation unit 131 of FIGS. 5 and 6 represents a critical manipulation unit within the RTO processor 117. For each line in the image, the edge calculation unit 131 reads the sorted list of QPF's for that line from the QPF memory 119, outputting PIXEL values and colours into the pixel FIFO 132 prior to display. The edge calculation unit 131 calculates the new values for the QPF on the next line and writes those to the QPF memory 119. While updating the QPFs, the edge calculation unit 131 also merges them in with the existing QPF list for the next line, resulting in a sorted list suitable for subsequent processing. The processing of each line is synchronised with the display 121 by means of a signal obtained from the fill and effects unit 136.

Functional Description:

For each line of display data, the edge calculation unit 131 must perform two functions. The first is to put the QPF's into the pixel FIFO 132 for display, and to update their value for the next line. The second is to merge the updated QPF's into the correct position in the QPF list for the next line, so that this line is ready to be processed as soon as the previous line has finished. The most critical resource in this process is the bandwidth on the QPF bus 118 and a specific method is adopted that minimises the number of QPF memory accesses required.

This is achieved by:

1. never changing the location of a QPF in memory—the merge list is constructed purely by updating pointers;
2. combining the merge operation with the display and update function, so that each QPF in the list is read only once; and
3. delaying the writing of list pointers, so that each pointer in the new list is written no more than once, and then only if the write is necessary.

In addition to pointer changes required when an updated QPF is merged between two existing QPF's in the new list, two QPF's on the current line can cross over when their new PIXEL values are calculated. In this case, it is necessary to reverse the order in which those two QPF's are merged into the list. Additional pointer updates are required when a QPF terminates on the current line.

Figure 12:
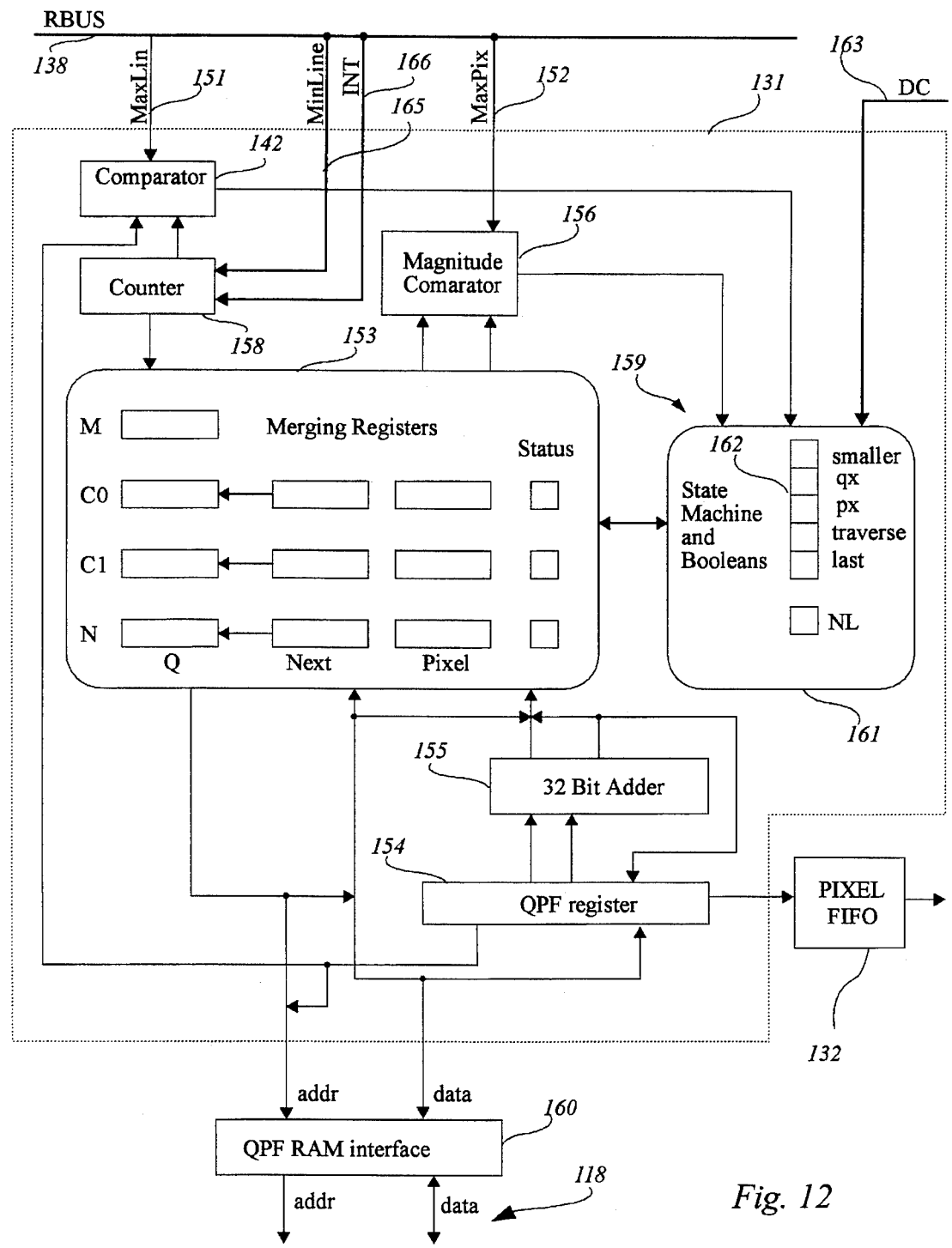
FIG. 12 is a schematic block diagram representation of the edge calculation unit.

The structure of the edge calculation unit 131 is shown in FIG. 12. The edge calculation unit 131 is input with constants MAXLIN 151 and MAXPIX 152 from the CSE registers 137. MAXPIX represents the maximum number of pixels (e.g. 720) displayed in a line, whilst MAXLIN represents the maximum number of lines (e.g. 625) displayed in an image. A set of merge registers 153 is provided which holds values for PIXEL and NEXT, for two QPF's from the current line in registers C0, C1, and one QPF from the next line in register N. A single register M holds the pointer address of the merging location in the next line. A single QPF register 154 is also provided which holds an entire QPF, and is used in the recalculation process of edge calculation.

The edge calculation unit 131 also comprises a number of calculation units comprising a 32-bit adder 155, a 16-bit magnitude comparator 156 which is input with values from the merge registers 153 and with the value MAXPIX 152. A 16-bit equality comparator 157 is also provided. A line counter 158 holds the number of the line currently being rendered (displayed) and inputs to the equality comparator 157 which also receives inputs from the QPF register 154 and from MAXLIN 151. The equality comparator 157 outputs to a control section 159, comprising a state machine 161 and a set of boolean registers 162. The equality comparator 157 controls transfers between registers, and to and from the calculation units. As also seen in FIG. 12, the edge calculation unit 131 outputs to the pixel FIFO 132 and also interfaces with the QPF memory 119 via the QPF Ram interface 160 and the QPF bus 118.

The QPF register 154 is used to store each QPF as it is read into the edge calculation unit 131 from the QPF memory 119. Once all four words of the QPF (as seen in FIG. 8) are in the merge registers 153, the new PIXEL and ΔPIXEL values, for the current line, are calculated in the manner earlier described using the 32-bit adder 155, and stored back in the QPF register 154. These updated values are subsequently stored back to the QPF memory 119. Simultaneously, the PIXEL and NEXT values are transferred into one of the merge registers 153, so that the updated QPF can be merged at the correct place in the list for the next line. If the QPF's END LINE value matches the line counter 158, it is not recalculated, and is discarded rather than being merged into the next line.

The merge registers 153 comprises three main registers C0, C1 and N. Registers C0 and C1 hold QPF's from the current line whilst register N holds a QPF from the next line. Each register is made up of four parts, Q, NEXT, PIXEL and STATUS.

The PIXEL value holds the integer portion of the PIXEL value for the QPF. NEXT holds the NEXT field of the QPF. The part Q holds the address of the QPF in QPF memory 119 (i.e.: it is a pointer to the QPF). Also, for each of the main merging registers, there are two STATUS bits which are VALID and CONTINUOUS respectively, and which are used to determine the status of the QPF's during merging. A further register M holds the address of the last QPF to be merged into the new list. This permits access to the NEXT field of this QPF, when a new QPF is merged into the list. QPF's are written in one of the C registers once their PIXEL values have been updated. Comparisons are then performed between PIXEL values in the registers C0 and C1 to determine which of the values is the smaller and whether this is smaller than the PIXEL value in the N register. Based on these comparisons, which occur within the magnitude comparator 156, and on the STATUS bits, the smallest of the three QPF's is merged into the new list, and replaced from the current or next line as appropriate. It is noted that the STATUS bits allow for the determination of whether or not the merging of the smallest QPF into the list requires a memory write cycle. Memory writes are only performed if required.

The pixel FIFO 132 is loaded from the QPF register 154 provided that a bit NL of the state machine 161 is not set and the QPF's PIXEL value is less than MAXPIX. When the pixel FIFO 132 is full, the edge calculation unit 131 stops fetching QPF's from the QPF memory 119.

The state machine 161 controls the loading of all the registers in the edge calculation unit 131 and of the pixel FIFO 132. It also selects the correct data paths to and from the 32-bit adder 155 and the comparators 156 and 157, and, in addition, sequences the operation of the edge calculation unit 131. To simplify the implementation of the state machine 161, several bits of information are kept as Boolean variables, as distinct from latches, within the state machine 161. These bits are:

SMALLER: indicating which of the registers C0 and C1 holds the smaller PIXEL value;

DX (QPF's crossed): this bit indicates whether the order of the QPF's in registers C0 and C1 has swapped following recalculation. This data is used in determining when pointer updates are required as the merge is performed;

PX (previous crossed): this is used in the case of one QPF swapping with many others;

TRAVERSE: this is used to determine whether the edge calculation unit 131 should continue to traverse QPF's in the current line, or whether some other action is required;

LAST: this bit is set when only one of the two QPF's in the registers C0 and C1 is valid (at the end of a line); and NL (next line): described below.

The edge calculation unit 131 gains access to the QPF memory 119 by driving address, data and control signals to the QPF RAM interface 100. The response time for QPF accesses can be as fast as one cycle, or it can take up to seven cycles, depending on the wait state setting of the QPF bus 118. Edge calculation unit 131 has the highest priority for accesses to the QPF bus 118 over the whole RTO processor 117. When the QPF bus 118 is set for zero wait states, the edge calculation unit 131 accesses complete in a single cycle.

The state machine 161 is also input with a single bit DC input 163 representing display complete. This signal is asserted by the fill and effects unit 136 at the end of each display line, and is used to synchronise the operation of the edge calculation unit 131. In this manner, the edge calculation unit 131 can operate in full synchronisation with the display 121.

The operation of the edge calculation unit 131 can now be described. The edge calculation unit 131 works through the QPF lists for the lines of the image one by one under the control of the DC input 163 and the NL (next line) register. The NL bit is set when the DC input 163 is asserted, and serves two functions. Firstly, when the NL bit is set, QPF data is not put into the pixel FIFO 132, although recalculation can continue. This means that no QPF's will be put into the pixel FIFO 132 after the display of the line has been completed. Also, when the edge calculation unit 131 completes the recalculation and merging of a line list, it will not move onto the next line unless the NL bit is set. The edge calculation unit 131 clears the NL bit when it moves onto the next line. This means that the edge calculation unit 131 will not start rendering a line before the time when the line is to be displayed, and will always recalculate and merge all of the QPF's in the line, even if this means delaying the start of the rendering of the next line.

When the edge calculation unit 131 commences operation, the line counter 158 is loaded from the MINLINE register 165, and the NL bit is cleared. While the value of the line counter 158 is negative, the edge calculation unit 131 does not attempt to process any QPF's. The edge calculation unit 131 waits for the NL bit to be set, then increments the line counter 158, and clears the NL bit. This sequence is continued until the line counter value becomes non-negative.

When the line counter 158 is non-negative, the edge calculation unit 131 reads the start of line pointer from the line pointer table 143 from the QPF memory 119, then increments the line counter 158 and reads the start of line pointer for the next line. The edge calculation unit 131 then follows the start of line pointer along the line, placing QPF's in the pixel FIFO 132, updating them in memory, and merging them into the next line list, according to the edge calculation process described above. QPF's are put into the pixel FIFO 132 as long as their PIXEL value does not exceed MAXPIXEL, and the NL bit is not set. Regardless of the NL bit, the edge calculation unit 131 continues to recalculate QPF's until it reaches the end of the line list.

When the edge calculation unit 131 reaches the end of the line list, it examines the NL bit. If this bit is not set, the edge calculation unit 131 pauses until it is set. The edge calculation unit 131 then clears the NL bit, and begins to process the QPF's for the next line. This continues for each line until the line counter reaches MAXLIN, at which point the edge calculation unit 131 stops until commencement of operation is reasserted.

As indicated earlier, the RTO processor 117, by virtue of the preprocessing pipeline 125 can operate for interlaced displays. When an INT (interlace) input 166 to the edge calculation unit 131 is asserted, the edge calculation unit 131 behaves as normal, except that the line counter 158 is incremented by two between lines, so that every second line is rendered. The bottom bit of the line counter 158 is replaced by an interlacing control bit. If the interlacing control bit is high, odd lines are rendered. The bottom bit of the line counter 158 is ignored in the comparison with MAXLIN.

The edge calculation unit 131 outputs two status bits onto the bus 140. A first status bit IRA is output when the image render is active. IRA is asserted as soon as image rendering is commenced, and not asserted when the line counter 158 reaches MAXLIN. A further status bit FBK is asserted while the line counter 158 is negative, indicating the frame blanking period of the rasterised display 121.

There are two error conditions for the edge calculation unit 131. The first is an underflow or overflow in the recalculation of the PIXEL or ΔPIXEL values for a QPF. When this occurs, an image rendering error output is asserted, and the TAG, LEVEL and EFFECTS bits of the QPF are latched into an image render data register in the CSE registers 37 for examination by the controlling host processor 114.

The other error occurs when image rendering is de-asserted before the line counter 158 reaches MAXLIN. In this case, an error bit for image rendering incomplete is asserted, and the line number latched into an image render in complete data register.

The edge calculation unit 131 has four registers that are accessible via the RBUS 138. MINLINES is written to set the number of lines in the frame blanking period. NEXT LINE represents the value of the line counter 158, and is a read-only register on the RBUS 138.

Figure 13:
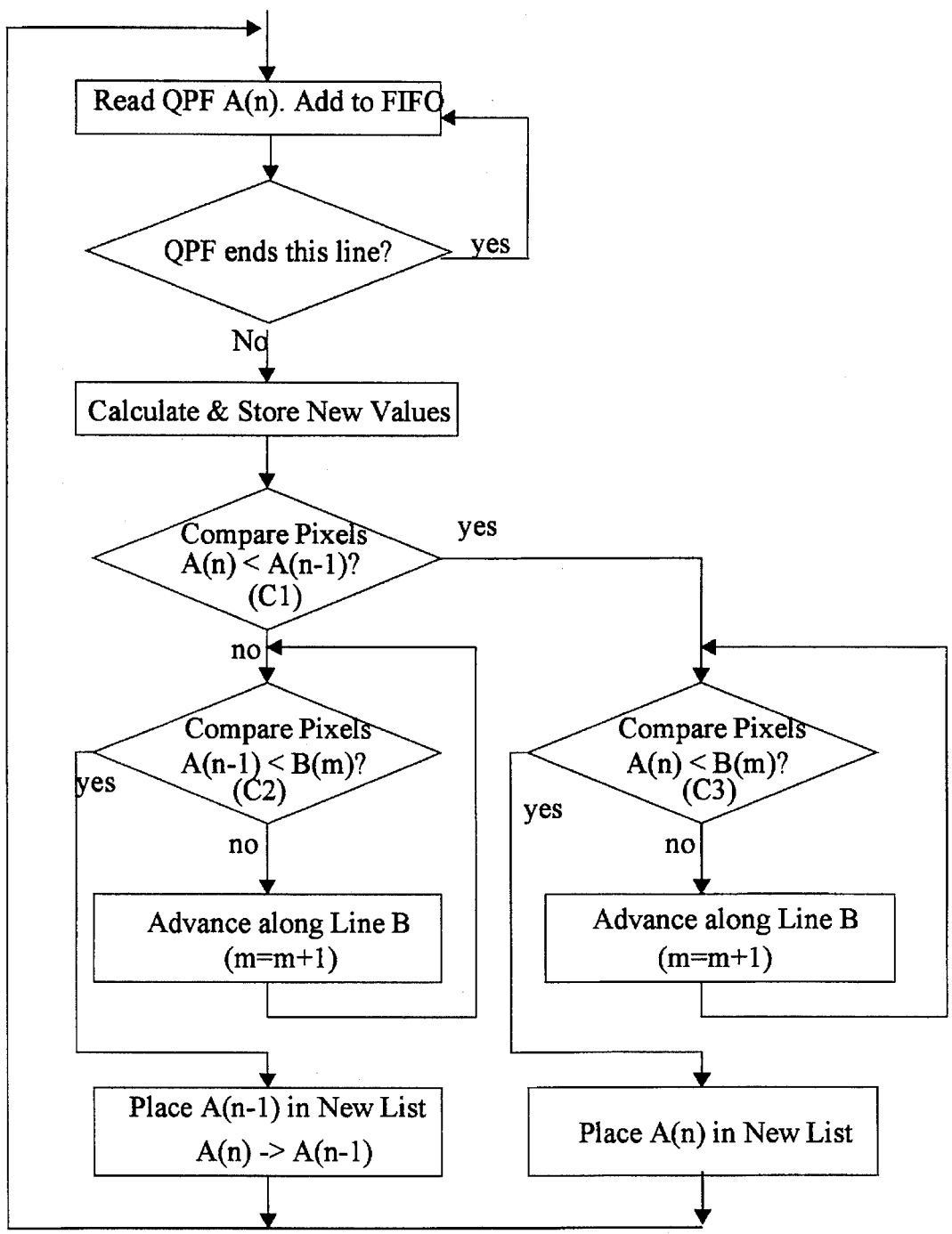
FIG. 13 is a flow diagram of the edge calculation process.
Figure 14:
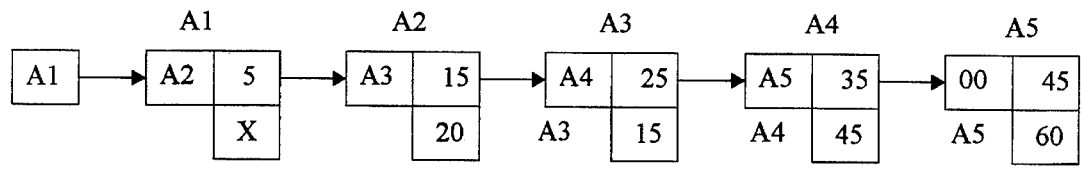
FIG. 14 and FIG. 15 show respectively the configuration of the linked list before and after each calculation.
Figure 14:
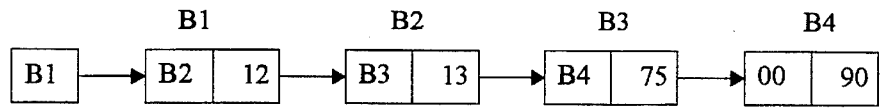
Figure 15:
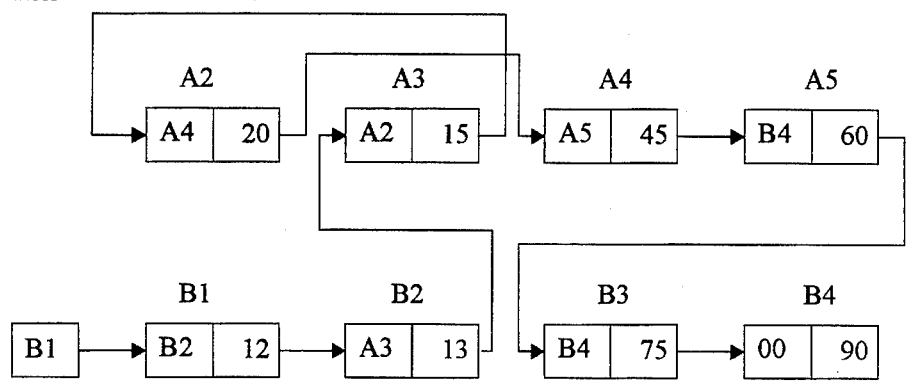

The main processing steps of edge calculation are shown in FIG. 13 along with an example of the operation of the calculation in FIG. 14 and FIG. 15.

In FIG. 14, two linked bits for consecutive lines A and B are shown before edge calculation and rendering of line A, which after edge calculation and rendering of line A, results in an amended version of the list for line B shown in FIG. 15.

In FIG. 14, the list for line A shows the values of PIXEL for the present line and the next line (line B). For example, QPF A2 has a current PIXEL value of 15, and a calculated value of 20 for the next line, as well as pointing to the next QPF in the list, A3. Applying the flow chart of FIG. 10 to FIG. 11, the start of list pointer initially points to QPF A1 which is read into the edge calculation unit 131 and output to the pixel FIFO 132 indicating Pixel #5 for display. QPF A1 ends on line A, as indicated by X, and so QPF A2 is read. This is then output to the pixel FIFO 132, indicating pixel #15, and the new PIXEL value of 20 calculated, which applies in the next line, line B. The new value of QPF A2 is stored in one of the merging registers C0 or C1.

QPF A3 is then read and output to the pixel FIFO 132 and its next line value calculated. QPF A3 is then stored in the remaining merging register C0 or C1 and the QPF's of the next line, line B are read. A2 and A3 are compared and the smallest is designated in the SMALLER register. In this case it is A3, which is used for subsequent comparisons. QPF B1 is read into the merging register N and its PIXEL value compared against that of A3.

The PIXEL value of B1 is less than both the new values of A2 and A3, and B1 moved to the merge register M. QPF B2 is read into register N and similarly compared. Again the PIXEL value is less, and QPF B3 is read into the merging register N. It is then determined that the PIXEL value of B3 is greater than that of A3 and so these QPF's are compared to determine which has the lower PIXEL value. The moving of QPF's in line B between registers N and M permits QPF's A2 and A3 to be merged into the list for the next line in this case between B2 and B3. Because QPF A3 has the lower PIXEL value, it is merged into the list and pointed to by B2.

The next QPF on the line A, QPF A4, is then read, output to the pixel FIFO 132, re-calculated and placed into the merging register (C0 or C1) which has been vacated by A3, whose address is moved to the register M for merging. QPF's A2, A4 and B3 are then compared, A2 found to be the lowest, and therefore merged into the new list after A3. The register M is updated with the address of A2.

The next QPF on line A, QPF A5, is then read, output to the pixel FIFO 132, re-calculated and placed in the merging register (C0 or C1) vacated by A2. QPF's A4, A5 and B3 are compared, A4 found to be the lowest and merged into the list. Because A5 is a terminal QPF, it is then compared with B3, found to be lower and merged into the list. This results in the new list for line B indicated in FIG. 15, having completed traversal of, and display of, the list for line A.

The foregoing describes only one embodiment of the present invention and modifications, obvious to those skilled in the art can be made thereto without departing from the scope of the present invention.

For example, the preferred embodiment has been configured to process graphic objects represented in a quadratic polynomial form, which enables fast calculation and real-time operation with todays consumer technology. However, other formats such as Bezier splines and the like can also be implemented in a similar manner, save for addition arithmetic logic devices required to calculate third order polynomials, as would be appreciated by those skilled in the art.

We claim:

1. A method of rendering units of object data, each said unit defining an individual outline curve segment comprised of plural pixels of an image in an object based graphics system, said method comprising the steps of:

traversing lists of said units, each said list pertaining to a single line of said image being rendered, and including only said units which define a curve segment that commences on said single line, said units being arranged in each said list in ascending order of a first pixel value of the corresponding curve segment;

for each unit of said object data, performing the steps of
(i) determining a pixel value for display;
(ii) calculating a new pixel value for each of the plural pixels for a subsequent line; and
(iii) merging said unit including the new pixel value into the list for the subsequent line in order with other said units in said subsequent line.

2. A method as claimed in claim 1 wherein said subsequent line is the next line to be displayed by a display device.

3. A method as claimed in claim 2, wherein the steps of determining a pixel value for display for each unit of the object data, calculating a new pixel value of said unit for a subsequent line for each unit of the object data, and merging the new pixel value into the list for the subsequent line for each unit of the object data, are applied sequentially to each unit in one of said lists prior to applying the determining step, the calculating step, and the merging step of the list pertaining to said subsequent line.

4. A method as claimed in claim 1 wherein at least one of said outline curve segments comprises at least one quadratic polynomial fragment including object data comprising:

an end line value corresponding to a displayable line on which the quadratic polynomial fragment ends;

a pixel value corresponding to a pixel position of a line upon which the quadratic polynomial fragment commences;

a gradient value corresponding to the gradient of the quadratic polynomial fragment on the line upon which the fragment commences; and a gradient derivative value corresponding to the derivative of the gradient of the quadratic polynomial fragment.

5. A method as claimed in claim 1 wherein said units are stored in a table indexed by a start line value corresponding to a line on which the corresponding outline curve segment commences.

6. A method as claimed in claim 1 wherein said merging step further comprises:

determining a least new pixel value of two current curve segments and one next line curve segment, and merging said least pixel value into the list for the next line.

7. A method as claimed in claim 1 wherein said merging step further comprises maintaining a pointer to the position of the previously inserted curve segment and updating the previous curve segment so that it points to the curve segment having the least pixel value.

8. Apparatus for rendering object data defining individual outline curve segments of an image in an object based graphics system, said apparatus comprising:

an edge position calculation means adapted to calculate an intersection of a curve segment with a current scan line of said image;

a next line calculation means adapted to calculate an intersection value of said curve segment with a subsequent scan line and to produce a subsequent scan line intersection value;

a list merge means adapted to receive said curve segment and said subsequent scan line intersection value for merging said curve segment and subsequent scan line intersection value into a list of additional curve segments that intersect said next line.

9. Apparatus as claimed in claim 8 wherein at least one of said outline curve segments comprises at least one quadratic polynomial fragment including object data comprising:

an end line value corresponding to a displayable line on which the quadratic polynomial fragment ends;

a pixel value corresponding to a pixel position of a line upon which the quadratic polynomial fragment commences;

a gradient value corresponding to the gradient of the quadratic polynomial fragment on the line upon which the fragment commences;

a gradient derivative value corresponding to the derivative of the gradient of the quadratic polynomial fragment.

10. Apparatus as claimed in claim 9 wherein said next line calculation means replaces said pixel value with said subsequent scan line intersection value.

11. Apparatus as claimed in claim 8 wherein said list merge means includes:

a first current register and a second current register adapted to hold portions of said curve segment active on a current line;

a next register adapted to hold portions of said curve segment active on a next line; and merging register adapted to hold the last curve segment merged into the next line.

12. Apparatus as claimed in claim 11 further comprising:

comparison means for determining the least value of said first current register, said second current register and said next register; and next line list update means connected to said comparison means for merging the curve segment associated with the least value as the next entry of the list of the curve segment associated with the merging register.

13. Apparatus as claimed in claim 12 further comprising an curve segment storage means whereby said curve segments are read from a memory storage device into said curve segment storage means, updated by said next line update means and merged into the next list and output to said memory storage device by said next line update means.

14. Apparatus as claimed in claim 8 wherein said subsequent line is the next line to be displayed by a display device.

15. A method of sorting data, said method comprising the steps of:

selecting an initial resolution for sorting;

decomposing said data into a plurality of ordered sets based on said resolution;

commencing with a first one of said sets, sorting said data within said set;

linking the sorted set with a next ordered set; and sequentially repeating the commencing step and the linking step until a last of said sets has been sorted, resulting in a recomposed sorted list of said data.

16. A method of sorting object data defining individual outline curve segments of an image in an object based graphics system, said method comprising the steps of:

(i) inputting said object data for each said curve segment and sequentially storing said object data as a plurality of linked lists each based on a start line of each said curve segment;

(ii) sorting each said linked list by:
(a) decomposing said object data within said list into a plurality of ordered sets each having a predetermined range resolution of pixel location values;
(b) commencing with a first one of said ordered sets;
(c) checking if said set has any entries and if so, sorting into a linked list said object data for said set by pixel location, and
(d) if not, proceeding to the next said set and repeating the checking step;

wherein each said linked list once created is linked with the list from the preceding set to form a single linked list of object data sorted by pixel value within a line.

17. A method of processing object data defining individual outline curve segments of an image in an object based graphics system, said image being intended for rasterised display, said method comprising the sequential steps of:

(i) inputting said object data and sequentially storing same as a plurality of linked lists based on a start line in said image of each said curve segment;

(ii) sorting each said linked list by:
(a) decomposing said object data within said list into a plurality of ordered sets each having a predetermined range resolution of pixel location values,
(b) commencing with a first one of said ordered sets;
(c) checking if said set has any entries and if said set has any entries, sorting into a linked list said object data of said set by pixel location, and
(d) if not, proceeding to the next said set and repeating the checking step; wherein each said linked list once created is linked with the list form the preceding set to form a single linked list of object data sorted by pixel value within a line;

(iii) real-time rendering said object data by the steps of:
(a) traversing said linked lists in ascending pixel order, each said list pertaining to a single line of said image being rendered; and
(b) for each curve segment data unit of each said list traversed, the steps of:
(i) determining a pixel value for display;
(ii) calculating a new pixel value of said unit for a subsequent line; and
(iii) merging the new pixel value into the list for the subsequent line in order with other said units in said subsequent line.

18. A method as claimed in claim 17 wherein each said outline curve segment comprises a quadratic polynomial fragment including object data comprising:

a start line value corresponding to a displayable line which the quadratic polynomial fragment commences;

an end line value corresponding to a displayable line on which the quadratic polynomial fragment ends;

a pixel value corresponding to a pixel position in said start line at which the quadratic polynomial fragment commences;

a gradient value corresponding to the gradient of the quadratic polynomial fragment on the line upon which the quadratic polynomial fragment commences; and a gradient derivative value corresponding to the derivative of the gradient of the quadratic polynomial fragment.

* * * * *

UNITED STATES PATENT AND TRADEMARK OFFICE
CERTIFICATE OF CORRECTION

PATENT NO. : 5,454,071
DATED : September 26, 1995
INVENTOR(S) : Silverbrook, et al.

It is certified that error appears in the above-indentified patent and that said Letters Patent is hereby corrected as shown below:

ON THE TITLE PAGE:

Under [54], "GRAPHIC" should read --GRAPHICS--;

Under [19], "Siverbrook et al." should read --Silverbrook et al.--; and

Under [75] Inventors, "Kia Siverbrook," should read --Kia Silverbrook,--.

COLUMN 1

Line 25, "101 and the polygon" should read --101.--;
Line 26, "101." should be deleted;
Line 52, "No." (first occurrence) should be deleted; and
Line 54 "of" should be deleted.

COLUMN 2

Line 50, "them" should read --there--.

COLUMN 3

Line 36, "shows" should read --show-- and "arts," should read --arts;--.

UNITED STATES PATENT AND TRADEMARK OFFICE
CERTIFICATE OF CORRECTION

PATENT NO. : 5,454,071
DATED : September 26, 1995
INVENTOR(S) : Silverbrook, et al.

It is certified that error appears in the above-indentified patent and that said Letters Patent is hereby corrected as shown below:

COLUMN 4

Line 16, "No." should be deleted;
Line 20, "cross-reference," should read --reference,--;
Line 29, "=START-PIXEL;" should read --=START_PIXEL;--;
Line 30, "=ΔPIXEL. Connected" should read
=ΔPIXEL.
    Connected--;
Line 35, "display" should read --display 121 --.
Line 49, "reference" should read --reference.--.

Signed and Sealed this

Twenty-ninth Day of October 1996

BRUCE LEHMAN

Attest:

Attesting Officer        Commissioner of Patents and Trademarks

UNITED STATES PATENT AND TRADEMARK OFFICE
CERTIFICATE OF CORRECTION

PATENT NO. : 5,454,071

DATED : September 26, 1995

INVENTORS : Kia Silverbrook, et al.

It is certified that error appears in the above-identified patent and that said Letters Patent is hereby corrected as shown below:

COVER PAGE:

[75] Inventors: "Kia Siverbrook" should read
--Kia Silverbrook--.

COLUMN 4:

Line 45, "Provisional Patent Application No." should be deleted; and
Line 46, "PL2149 (Attorney Ref: (RT09)(203174)" should be deleted.

COLUMN 6:

Line 51, "and" should read --an--.

Signed and Sealed this

Fourth Day of November, 1997

Attest:

BRUCE LEHMAN

Attesting Officer   Commissioner of Patents and Trademarks